May 24, 1949. W. C. HOYT, SR 2,471,326
LEAF SEPARATOR FOR BERRY PICKING MACHINES
Filed April 17, 1944 2 Sheets-Sheet 1

INVENTOR.
W. C. HOYT SR.
BY
Cook & Robinson
ATTORNEYS

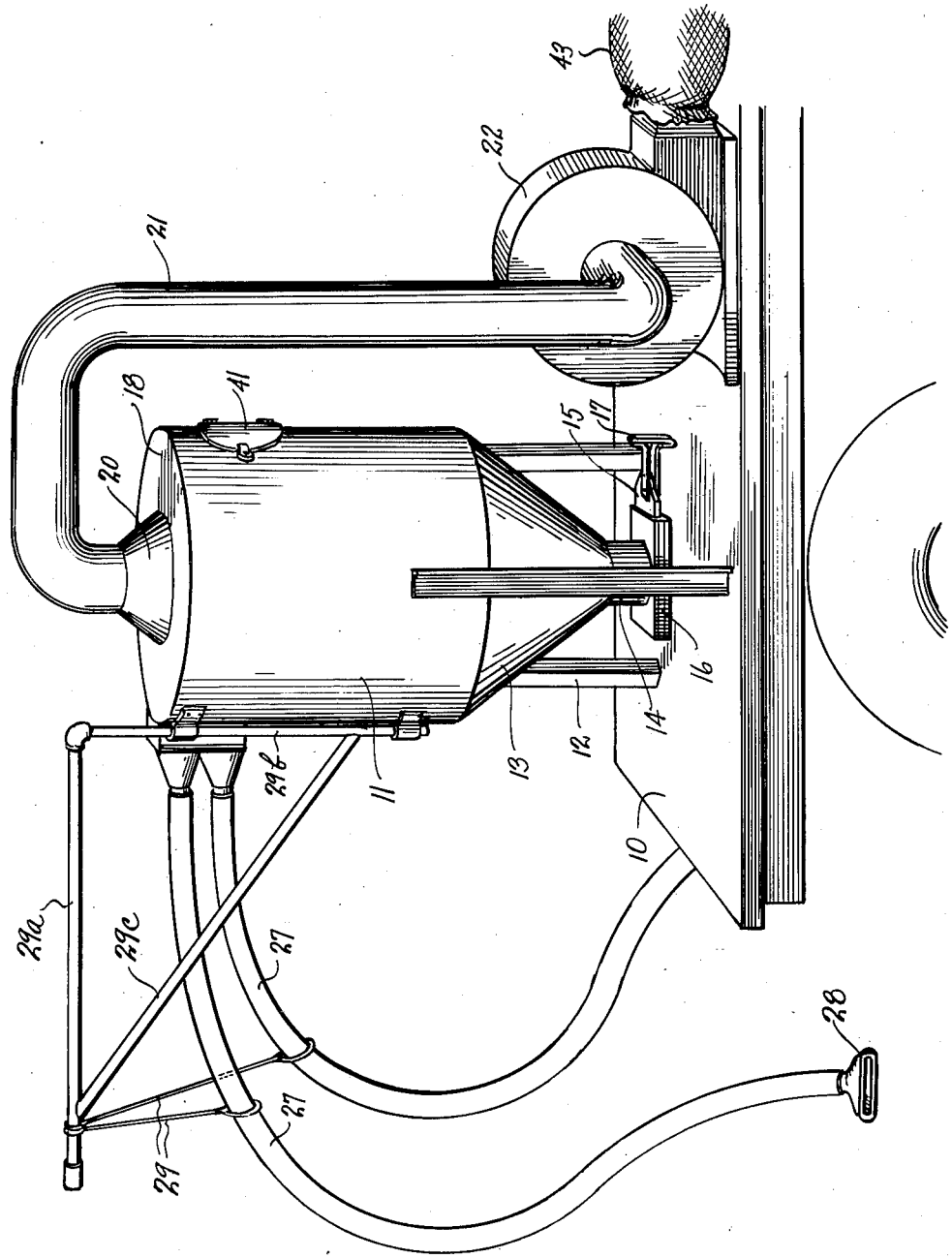

Patented May 24, 1949

2,471,326

UNITED STATES PATENT OFFICE 2,471,326

LEAF SEPARATOR FOR BERRY PICKING MACHINES

William Clinton Hoyt, Sr., Aberdeen, Wash.

Application April 17, 1944, Serial No. 531,405

1 Claim. (Cl. 209—144)

This invention relates to mobile berry picking machines, and it has reference more particularly to improvements in machines employing air suction for the picking of berries of those particular kinds which, due to their character, or by reason of the character of the plants on which they grow, are difficult to pick by hand.

It is the principal object of this invention to provide an improved type of pneumatic machine for the economic and satisfactory picking of cranberries, and the like, utilizing air suction for the stripping or picking of the berries from the plants on which they grow, and for effecting the separation therefrom of the leaves, twigs, vines, etc., which might be drawn into the machine along with the berries.

Another object of the invention is to provide means for preventing the bruising of the berries when discharged in the machine.

Another object of the invention is to provide a berry picker that automatically effects the separation of twigs and leaves from the berries in the separator chamber.

Still another object of this invention is to provide an easily portable machine that will accommodate a plurality of berry pickers.

Further objects of the invention reside in the details of construction of parts embodied in the machine, in their combination, relationship and mode of use as will hereinafter be fully described.

In accomplishing these and other objects of the invention, I have provided the improved details of construction, the preferred forms of which are illustrated in the accompanying drawings, wherein—

Fig. 3 is a perspective view of the machine.

Figure 1:
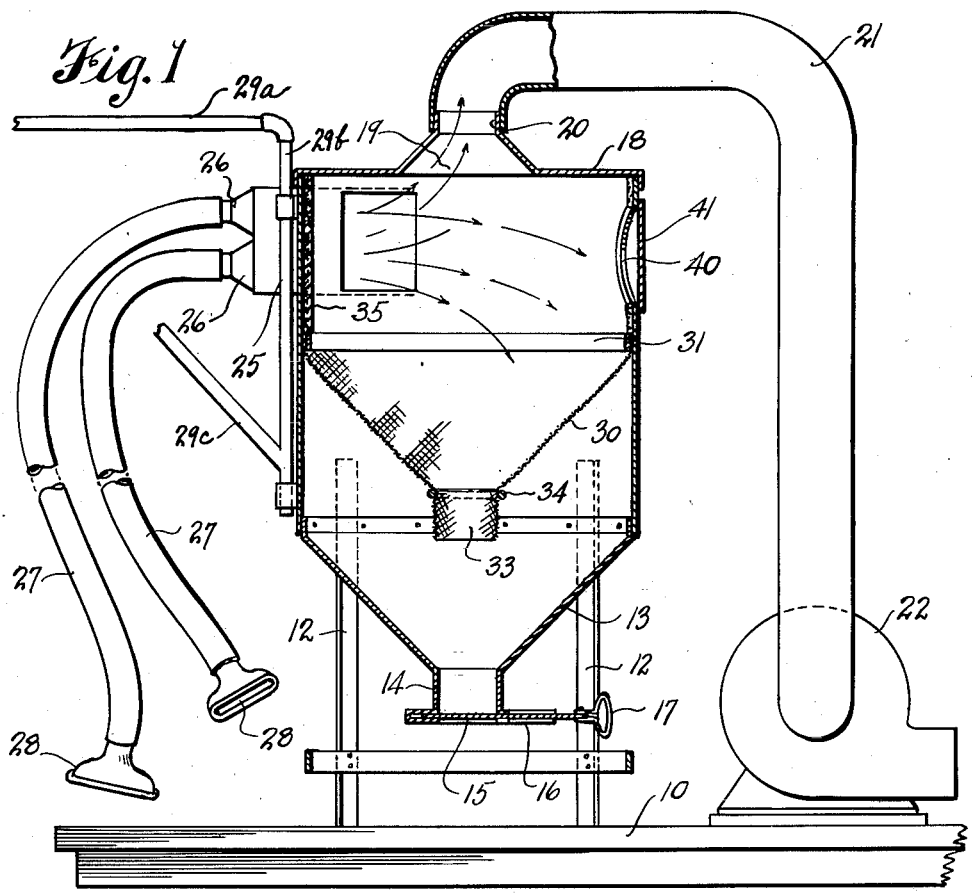
Fig. 1 is a side view of the present machine, showing the separator housing in vertical section for better understanding.

Briefly described, the present berry picking machine is a portable unit comprising a closed housing of cylindrical form, forming a separator chamber to the upper end of which a suction pipe, leading from an air suction device, is connected. Opening into the chamber through a side wall of the housing, in a tangental direction, is a suction manifold from which a plurality of sucker tubes are extended. These tubes are equipped at their ends with suction nozzles for picking off the berries from the plants.

The bottom wall of this housing is in the form of a conical hopper and has a central, berry discharge opening normally closed by a slide valve, and suspended in the housing from its side walls, and serving as a horizontal partition member, is a fabric catch basin that receives the berries upon their delivery into the chamber, and this basin has a discharge opening into the hopper.

Referring more in detail to the drawings—

The present machine is intended to be mounted for use upon a mobile vehicle, such as an automobile truck or the like, that may be driven or drawn through the field from which the berries are to be picked. Therefore, in Fig. 1 of the drawing, I have designated, by reference numeral 10, what may be a part of the flat bed of such a truck, on which the parts embodying the present machine are operatively mounted.

In its present preferred form, the machine comprises a closed, cylindrical housing 11, vertically disposed, and functionally mounted on the bed 10 by legs 12 that are fixed thereto. The housing preferably is made of sheet metal and is closed at its lower end by a wall 13 forming a conical berry collecting hopper. The hopper leads into a discharge spout 14 that is normally closed by a valve plate 15, operable in horizontal guides 16 and equipped with a handle 17 whereby it may be shifted between closed and open positions. When closed, it retains the berries, and when open, it permits berries to flow out and air to enter.

Figure 2:
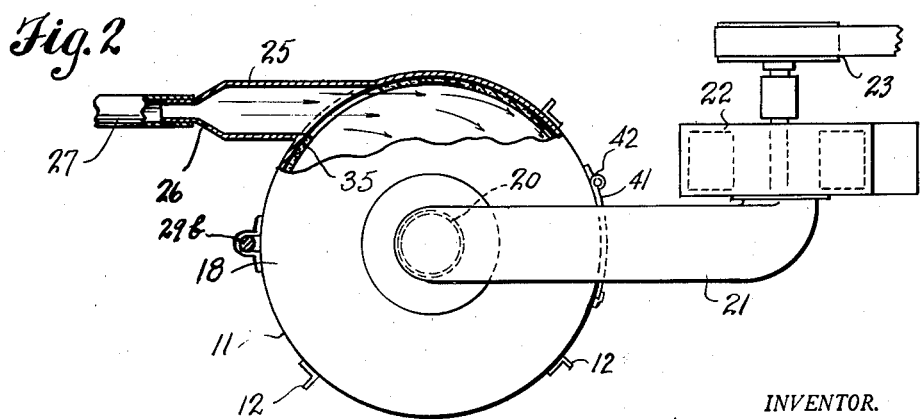
Fig. 2 is a top or plan view of the machine, a part of the top wall of the separator housing being broken away for better illustration.

The top wall 18 of the housing has a central opening 19 surrounded by a neck 20 to which a suction pipe 21 is connected. Pipe 21 leads from the separator to the suction side of an air suction device 22 that is mounted on the bed 10. This device may be a suction blower of any suitable type and it might be driven by any suitable power device, such as an engine or electric motor, not herein shown, through a belt and pulley connection designated at 23, in Fig. 2.

Opening into the upper end of the separator housing, in a tangental direction, is a suction manifold 25, which at its outer end is equipped with a plurality of branch connections 26 to which flexible sucker tubes 27 are connected. These sucker tubes would be of such length as to extend from the vehicle to the bushes or plants from which the berries are to be picked, and would be made as light as practical. Each tube is fitted at its outer end with a suitable suction nozzle 28 which may be of that design shown, or of other suitable shapes, as might be found satisfactory.

In order to provide for easier handling of the suction tubes by the pickers, it is preferred that they be suspended as seen in Fig. 3, by hangers or straps 29 from the horizontal arm 29a of a boom that is fixed to the housing 11. This boom comprises the vertical base member 29b and diagonal brace 29c, and the base is hinged so that the arm 29a may swing across the end of the vehicle from side to side thereof.

Suspended within the separator chamber formed by the cylindrical housing, below the horizontal level of the inlet from the suction manifold, is a catch bag or basin 30 made of a soft, flexible fabric. This piece of fabric is secured about its edge to the side walls of the housing by an overlying annular band 31 which is secured by suitable bolts or rivets. This fabric forms a conical basin in the nature of a dividing partition between upper and lower end portions of the separator chamber and has a central opening 33 surrounded by a metal ring 34 that, due to its weight, normally holds the fabric wall in its downwardly suspended position.

The berries that are drawn into the separator chamber through the sucker tubes 27 and manifold 25, drop first onto this fabric basin, then fall through its central opening 33 into the berry collecting hopper that is formed by the bottom wall of the housing. Discharge of berries from the hopper is controlled by the valve plate 15.

It is desirable also to provide the upper portion of the housing 11 interiorly with a lining of sponge rubber or other suitable material to prevent the berries being bruised when discharged into the separator. Such a lining is designated at 35 in Figs. 1 and 2, and it may be adhesively secured or held by suitable rivets.

In the side wall of the housing, at about the same horizontal level of the manifold 25, is an opening 40 normally closed by a door 41 that is attached to the housing by hinges 41a. This opening is of sufficient size as to permit a workman extending his arm therethrough into the housing. Normally this door is closed over the opening to maintain partial vacuum in the chamber during operation of the machine.

Assuming the machine to be so constructed, it is used as follows: With the berry discharge spout 14 closed by valve plate 15 and the housing opening 40 covered by the door 41, the operation of the suction device 22 will cause air to be drawn from the housing 10 and suction to be created in the manifold 25 and transmitted to the several sucker tubes 27. Persons handling the sucker tubes will extend the suction nozzles among the plants and the berries will be picked or sucked off and drawn into the tubes and finally into the separator chamber through manifold 25 which discharges them tangentially into the chamber. The berries, due to their weight and size, will spiral down into the fabric catch basin and finally will fall through its central opening into the collecting hopper in the base of the housing. Leaves and twigs drawn into the housing with the berries, will, for the greater part, be drawn from the top of the chamber into the suction pipe 21 and discharged through the blower.

When it is desired that the collected berries be discharged from the hopper, the door 41 is first opened to break the partial vacuum in the chamber above the fabric catch basin, then the valve 15 is opened and the berries are allowed to be discharged through spout 14. Then the door 41 is closed just enough to let berries come down and leaves to go out through the fan. This causes the suction applied through pipe 21 to reverse the position of the catch basin and incidentally to draw all leaves or twigs that may have collected therein, into the pipe 21 to be discharged through the suction device. Then valve 15 is closed and the fabric catch basin falls again into the depending position as shown in Fig. 1.

The tangental direction of the suction manifold 25 entering the separator housing, causes the berries to be delivered tangentally against the side walls of the housing without injury, then to drop easily onto the fabric basin, thus to avoid bruising or mashing.

It is desirable also that the discharge end of the suction blower be equipped with a suitable mesh bag, as has been designated by reference character 43 in Fig. 3, to catch the leaves and twigs that are discharged through it.

Such machines may be made in various sizes and might be equipped with one or more of the suction manifolds as found necessary or desirable for the work being done.

It is apparent also that changes in details of construction might be made without departing from the spirit of the invention, and for this reason it is not desired that the claim shall be confined strictly to the details shown, but that it shall be given an interpretation that is commensurate with the invention disclosed.

Having thus described my invention, what I claim as new therein and desire to secure by Letters Patent is—

In a berry picking machine, a closed, vertically disposed cylindrical housing providing a closed separating chamber and having a horizontal upper end wall formed centrally with a suction connection, and closed at its lower end by a wall forming a berry receiving hopper, a suction manifold opening into the housing adjacent the upper end wall, tangentally thereof, and equipped for the attachment of sucker tubes thereto, a fabric basin suspended in the chamber from the side walls thereof as a partition wall between upper and lower end portions of the housing, and forming a conical receiving basin for berries drawn into the chamber through the suction manifold; said basin having a restricted central discharge opening into the receiving hopper and said hopper having a normally closed discharge opening and said housing being formed above the partition wall with a vacuum relief opening and a removable closure therefor.

WILLIAM CLINTON HOYT, Sr.

REFERENCES CITED

The following references are of record in the file of this patent:

UNITED STATES PATENTS

| Number | Name | Date |
|---|---|---|
| 911,258 | Neumann | Feb. 2, 1908 |
| 938,656 | Frickey | Nov. 2, 1909 |
| 1,185,110 | LeBaron | May 30, 1916 |
| 1,302,531 | Dilley | May 6, 1919 |
| 1,856,685 | Anderson | May 3, 1932 |
| 2,115,134 | Andersen | Apr. 26, 1938 |
| 2,131,672 | Rich | Sept. 27, 1938 |
| 2,165,946 | Smith | July 11, 1939 |
| 2,257,552 | Hammack | Sept. 30, 1941 |